`United States Patent Office`

3,132,162
Patented May 5, 1964

3,132,162
2-METHOXYMETHYL - 17α - SUBSTITUTED ESTRADIOL-3-METHYL ETHERS AND THEIR PREPARATION
Hidehiko Kaneko, Minoo-shi, Masahisa Hashimoto, Toyonaka-shi, and Katsunori Kawase, Osaka, Japan, assignors to Dainippon Pharmaceutical Co., Ltd., Osaka, Japan, a corporation of Japan
No Drawing. Filed Feb. 13, 1963, Ser. No. 258,155
Claims priority, application Japan Feb. 16, 1962
7 Claims. (Cl. 260—397.5)

This invention relates to novel 2-methoxymethyl-17α-substituted estradiol-3-methyl ethers and to the processes for preparing such compounds. More particularly, the invention relates to novel compounds of the formula

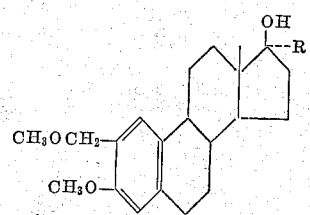

wherein R is either a lower alkyl such as methyl, ethyl and propyl or ethynyl; and to the processes for producing thereof.

The novel compounds of this invention are useful because of their valuable pharmalogical properties. For example, these compounds possess serum cholesterol lowering activity. Moreover, they are also useful as intermediates in preparing other useful steroids.

One of the processes for preparing the new compounds of this invention is illustrated by the following equation:

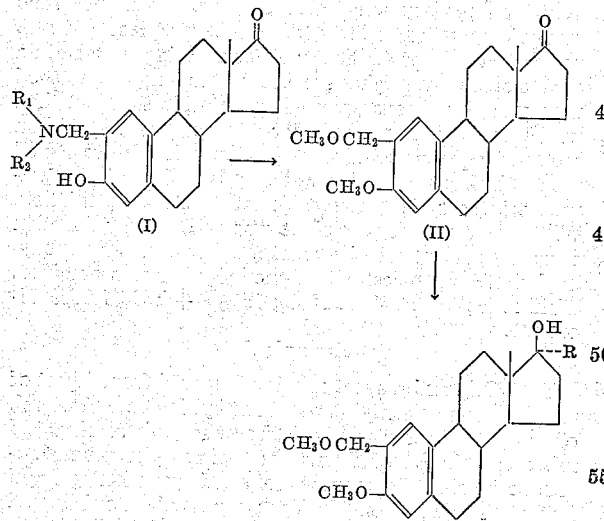

wherein R is as hereinabove indicated, $R_1$ and $R_2$ are each lower alkyls having 1–4 carbon atoms, and $R_1$ and $R_2$ when taken together can form with nitrogen atom a heterocyclic group such as piperazino, piperidino or morpholino.

2-N-di-substituted-aminomethyl estrone of Formula I which is the starting material is known. Since this compound has a strong hydrogen bond between the hydroxyl group of 3-positions and the nitrogen atom of the aminomethyl group of 2-position, under normal alkylating conditions the alkylation of the hydroxyl group of 3-position is difficult to effect.

According to the process of the present invention, it was found that when 2-N-di-substituted aminomethyl estrone of Formula I above is reacted at reflux temperature with dimethyl sulfate in methanol in the presence of an alkali hydroxide such as potassium or sodium hydroxide, the hydroxyl group of 3-position is converted to methyl ether and the N-di-substituted amino group of the N-di-substituted aminomethyl group of 2-position is substituted with a methoxy group to yield the novel compound 2-methoxymethyl estrone-3-methyl ether. Preferably, the alkali hydroxide and dimethyl sulfate are used in about equimolar quantities.

When to the 17-position of the so obtained 2-methoxymethyl estrone-3-methyl ether of Formula II a substituent group R is introduced, the intended compounds can be obtained. The introduction itself of the substituent group R is achieved by a known technique. Namely, when a lower alkyl magnesium halide having 1–3 carbon atoms is reacted with the compound of Formula II under usual Grignard reaction conditions followed by hydrolysis, a lower alkyl can be introduced to the 17α-position of the compound of Formula II. On the other hand, by reacting the compound of Formula II with an alkali metal acetylide such as potassium acetylide and sodium acetylide in an inert solvent such as ether, dioxane and tetrahydrofuran, ethynyl can be introduced to the 17α-position of the compound of Formula II.

When the 2 - methoxymethyl - 17α - ethynyl - estradiol-3-methyl ether is catalytically hydrogenated by conventional procedures, for example by reduction with hydrogen using as the catalyst palladium, platinum or Raney nickel, another claimed compound, 2-methoxymethyl-17α-ethyl-estradiol-3-methyl ether, is obtained. This manner of introducing the ethyl group is preferable to the direct introduction by the Grignard reaction, since better yields are obtained.

The other two processes for preparing the compounds of this invention are illustrated by the following equations:

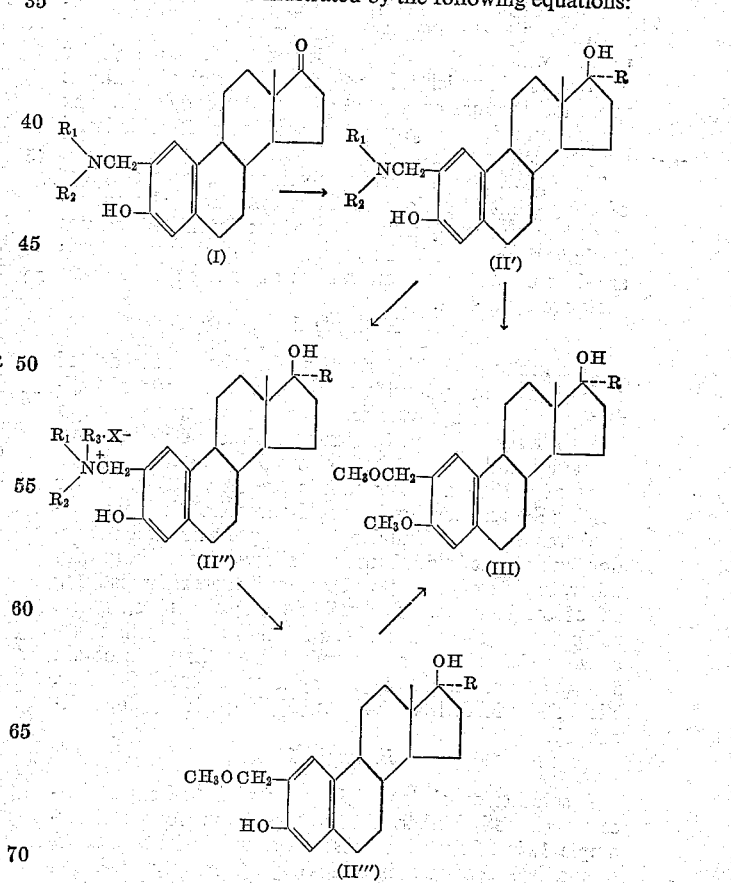

wherein R, $R_1$, and $R_2$ are as previously indicated, $R_3$ is a lower alkyl having 1-3 carbon atoms, and X is a halogen.

One of the processes is that represented by

This process is that in which the sequence of steps 1 and 2 of the previously described process have been interchanged. Namely, first, the lower alkyl group or ethynyl group is introduced to the 17α-position of the starting material [I] by means of the procedure which itself is known to prepare 2-N-di-substituted aminomethyl-17α-substituted estradiol of Formula II, after which this is reacted at reflux temperature with dimethyl sulfate in methanol in the presence of an alkali hydroxide, whereby the intended compound [III] is obtained.

The other process is that which is represented by

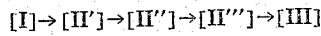

Namely, first, a lower alkyl group having 1-3 carbon atoms or an ethynyl group is introduced to the 17α-position of the starting material [I] by means of the procedure which itself is known, then the resultant 2-N-di-substituted aminomethyl-17α-substituted estradiol is reacted with a lower alkyl halide having 1-4 carbon atoms to form a quaternary salt, following which said quaternary salt is hydrolyzed with a methanolic alkali to form 2-methoxymethyl-17α-substituted estradiol, and thereafter by 3-methyl-etherification of said 2-methoxymethyl-17α-substituted estradiol by means of the procedure which itself is known the intended compound is obtained. By reacting the 2-N-di-substituted aminomethyl-17α-substituted estradiol of formula II' with a lower alkyl halide (as the halogen, Cl, Br or I) such as methyl iodide the quaternary salt of Formula II" is crystallized quantitatively. When potassium or sodium hydroxide is added to the solution of the obtained quaternary salt in methanol and refluxed, it being hydrolyzed, the 2-methoxymethyl-17α-substituted estradiol of Formula II''' is formed. When this is methyl-etherified by the technique of methyl-etherification of phenol, which technique itself is known; for example, by a procedure in which it is reacted with dimethyl sulfate at room temperature or reacted with methyl iodide at reflux temperature, its OH group of 3-position is etherified and the intended compound [III] is formed.

The following examples will better illustrate the nature of the present invention; however, these examples are intended to be merely illustrative of the invention and not in limitation thereof. In the examples all temperatures are degrees centigrade, and unless otherwise specified, all parts are by weight.

*Example 1*

To a mixture of 250 parts of methanol and 100 parts of 17% potassium hydroxide was added 8.25 parts of 2-dimethylaminomethyl estrone. The mixture was heated to 60° with stirring, and 30 parts of dimethyl sulfate was gradually added dropwise, followed by addition of 17 parts of a 17% aqueous caustic potash solution. After heating the reaction liquid for 5 hours with stirring, methanol was distilled off under reduced pressure, and extraction was effected with benzene, followed by washing with water, drying with Glauber's salt and thereafter distilling off of the benzene. The residule was chromatographed using neutral alumina, and the fraction eluted with ether-benzene (2:3) was recrystallized from methanol to obtain 5.1 parts of 2-methoxymethylestrone-3-methyl ether. Yield 58%; M.P. 124-126° C.; $[\alpha]_D^{24}$ +146° (1.09% dioxane).

*Example 2*

A solution consisting of 10 parts of 2-methoxymethyl-estrone-3-methyl ether, obtained by the procedure of Example 1, in 350 parts of absolute ether, in its cool state, was added dropwise into a Grignard reagent solution formed from 3.3 parts of magnesium in 70 parts of absolute ether and 22 parts of methyl iodide in 70 parts of absolute ether. After completing the dropwise addition, the mixture was heated under reflux followed by adding dilute hydrochloric acid to the reaction product to effect decomposition, after which extraction thereof was effected with ether, followed by washing with water, drying with anhydrous sodium sulfate, and thereafter distilling off of the solvent. The residue was recrystallized from n-hexane, this operation being repeated three times, whereby was obtained 6 parts of 2-methoxymethyl-17α-methyl estradiol-3-methyl ether. Yield 57%; M.P. 131-133° C.; $[\alpha]_D^{32}$ +48.5° (1.03% dioxane).

*Example 3*

A solution consisting of 10 parts of 2-methoxymethyl-estrone-3-methyl ether, obtained by the procedure of Example 1, in 430 parts of absolute ether, in its cool state, was added dropwise into a Grignard reagent solution formed from 3.3 parts of magnesium in 110 parts of absolute ether and 16.7 parts of ethyl bromide in 70 parts of absolute ether. After refluxing for 3.5 hours, dilute hydrochloric acid was added and decomposition of the mixture was effected. When the oily substance obtained by extracting the water layer with ether, washing with water, drying and then distilling off the solvent was chromatographed with silica gel and the portion eluted with benzene-ether (4:1) was recrystallized from ether, 4.4 parts of 2-methoxymethyl-17α-ethylestradiol - 3 - methyl ether was obtaned. Yield 40%; M.P. 92° C.; $[\alpha]_D^{20}$ +81.4° (1.13% dioxane).

*Example 4*

4.4 parts of the 2-methoxymethylestrone-3-methyl ether, obtained as in Example 1, was dissolved in 430 parts of absolute ether. While cooling with ice and stirring, the solution was saturated with acetylene gas, after which to this solution was gradually added dropwise 130 parts of a solution consisting of potassium tertiary amyl alcoholate in tertiary amyl alcohol (5 parts metallic potassium and 125 parts tertiary amyl alcohol), are thereafter while maintaining a temperature of 0° C., acetylene gas was passed through for 4.5 hours: After allowing to stand in a cold storage overnight, the ether solution was washed with a 10% aqueous ammonium chloride solution, then washed with water, and after further washing with a saturated aqueous solution of sodium chloride, was dried with anhydrous sodium sulfate. After distilling the solvent off, the residue was subjected to steam distillation. When the resultant precipitate was collected by filtration and recrystallized from n-hexane, 2.8 parts of 2-methoxymethyl-17α-ethynylestradiol-3-methyl ether was obtained. Yield 59%; M.P. 149-151° C.; $[\alpha]_D^{32}$ +6.6° (1.06% dioxane).

*Example 5*

To a Grignard reagent solution prepared from 1 part of metallic magnesium, 6 parts of methyl iodide and 40 ml. of absolute ether was added dropwise with stirring 125 ml. of a solution of 5 parts of 2-dimethylaminomethyl-estrone in absolute benzene, followed by refluxing for 5 hours. The reaction liquid was poured into ice cold water and decomposed, after which it was alkalized with ammonia and extracted with chloroform. The organic solvent layer was separated, washed with water, dried, and thereafter concentrated. When the residue was recrystallized from methanol, 4.1 parts of 2-dimethylamino-methyl-17α-methyl estradiol was obtained. M.P. 172-175° C.; $[\alpha]_D^{24}$ + 57° (1.1% chloroform).

*Example 6*

To 3.5 parts of the 2-dimethylaminomethyl-17α-methyl estradiol obtained by the procedure of Example 5 were added 140 parts of methanol and 27 parts of a 17% aqueous solution of potassium hydroxide, after which the solution was heated to 60° C. To this was then gradually added dropwise 11.35 parts of dimethyl sulfate, further addition being made of 13 parts of the 17% aqueous potassium hydroxide solution during the interim, after which refluxing was effected for 5 hours. The reaction liquid was concentrated under reduced pressure, the methanol distilled off, and after diluting by adding water, extraction was effected with benzene. The benzene solution was washed with water, dried with Glauber's salt and concentrated. 3 parts of the residual oil was mixed with a small quantity of benzene, and chromatographed using neutral alumina. When the fraction eluted with ether-benzene (1:2–1:1) was recrystallized from methanol and then from n-hexane, 1.8 parts of 2-methoxymethyl-17α-methylestradiol-3-methyl ether was obtained. M.P. 131–133° C.

*Example 7*

To an ether solution of 2-dimethylaminomethyl-17α-methyl estradiol, obtained by the procedure of Example 5, was added an excess of methyl iodide, after which the solution was allowed to stand. When the crystals separated were collected by filtration and recrystallized from acetone, a quaternary salt having M.P. 217–219° C. was obtained. One part of this quaternary salt was dissolved in 20 parts of methanol, to which was then added 4 parts of 50% caustic potash solution, after which the solution was refluxed for 3 hours. After distilling off the methanol, diluting the residue with water and acidifying with hydrochloric acid, extraction was effected with ether. The ether layer was washed with water, dried and thereafter concentrated whereby was obtained 0.65 part of an oil. When the fraction obtained by dissolving this in a small quantity of benzene, chromatographing with silica gel and eluting with ether-benzene (1:10) was crystallized from methanol, 0.51 part of 2-methoxymethyl-17α-methyl estradiol was obtained. M.P. 157–158° C.; $[\alpha]_D^{20}$ +53.9° (1.02% chloroform).

*Example 8*

To 0.7 part of the 2-methoxymethyl-17α-methyl estradiol, as obtained in Example 7, which was dissolved in 15 parts of methanol were added dropwise in turn with stirring 3 parts of 10% aqueous potassium hydroxide solution and 2 parts of dimethyl sulfate. After completion of these dropwise additions, further addition of 0.5 part of the aqueous potassium hydroxide solution was made, after which the solution was stirred for 4 hours. The reaction liquid was decomposed with water and extracted with ether, after which the ether layer was washed with water, dried and concentrated. When 0.7 part of the obtained oil was triturated in methanol, crystallization took place. When this was recrystallized from n-hexane, 0.65 part of 2-methoxymethyl-17α-methyl estradiol-3-methyl ether was obtained. M.P. 132–133° C. Even when this compound is melt blended with the 2-methoxymethyl-17α-methyl estradiol-3-methyl ether obtained by Example 2, a drop in its melting point does not occur.

What is claimed is:

1. A 2-methoxymethyl-17α-substituted estradiol-3-methyl ether of the formula

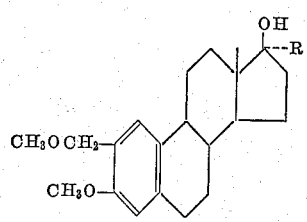

wherein R is selected from the group consisting of a lower alkyl having 1–3 carbon atoms and ethynyl.

2. 2-methoxymethyl-17α-methyl estradiol-3-methyl ether.

3. 2-methoxymethyl-17α-ethyl estradiol-3-methyl ether.

4. 2-methoxymethyl-17α-ethynyl estradiol-3-methyl ether.

5. A process for preparing a 2-methoxymethyl-17α-substituted estradiol-3-methyl ether of the formula

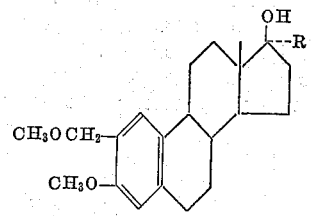

wherein R is selected from the group consisting of a lower alkyl having 1–3 carbon atoms and ethynyl, characterized in that a 2-N-di-substituted aminomethyl estrone of the formula

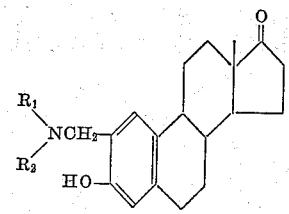

wherein $R_1$ and $R_2$ are alkyls having 1–4 carbon atoms and $R_1$ and $R_2$ when taken together form with N atom a heterocyclic group selected from the class consisting of piperazino, piperidino and morpholino, is reacted with dimethyl sulfate in methanol at reflux temperature in the presence of an alkali hydroxide and thereafter a substituent R (which R is as defined hereinabove) is introduced to the 17-position of the resultant reaction product whereby the intended compound is obtained.

6. A process for preparing a 2-methoxymethyl-17α-substituted estradiol-3-methyl ether of the formula

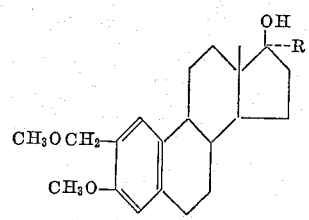

wherein R is selected from the group consisting of a lower alkyl having 1–3 carbon atoms and ethynyl, characterized in that to a 2-Ni-di-substituted aminomethyl estrone of the formula

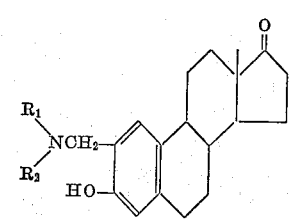

wherein $R_1$ and $R_2$ are alkyls having 1–4 carbon atoms and $R_1$ and $R_2$ when taken together form with N atom a heterocyclic group selected from the class consisting of piperazino, piperidino and morpholino, at its 17-position is introduced a substituent R (which R is as defined hereinabove), and thereafter the resultant reaction product is reacted with dimethyl sulfate in methanol at reflux temperature in the presence of an alkali hydroxide, whereby the intended compound is obtained.

7. A process for preparing a 2-methoxymethyl-17α-substituted estradiol-3-methyl ether of the formula

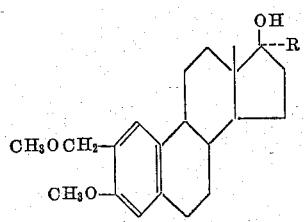

wherein R is selected from the group consisting of a lower alkyl having 1–3 carbon atoms and ethynyl, characterized in that to a 2-N-di-substituted aminomethyl estrone of the formula

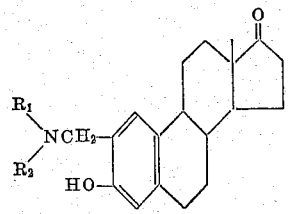

wherein $R_1$ and $R_2$ are alkyls having 1–4 carbon atoms and $R_1$ and $R_2$ when taken together form with N atom a heterocyclic group selected from the class consisting of piperazino, piperidino and morpholino, at its 17-position is introduced a substituent R (which R is as defined hereinabove), following which the resultant 2-Ni-di-substituted aminomethyl-17α-substituted estradiol is reacted with a lower alkyl halide having 1–4 carbon atoms to form a quaternary salt, said quaternary salt is hydrolyzed to form 2-methoxymethyl-17α-substituted estradiol, and thereafter said 2-methoxymethyl-17α-substitued estradiol is 3-methyl-etherified, whereby the intended compound is obtained.

No references cited.